United States Patent Office 2,868,728
Patented Jan. 13, 1959

2,868,728

SALTS OF ACRYLAMIDE-ACRYLIC ACID ESTER COPOLYMERS AS GREASE-THICKENING AGENTS

Bruce W. Hotten, Orinda, and Warren Lowe, Berkeley, Calif., assignors to California Research Corporation, San Francisco, Calif., a corporation of Delaware No Drawing. Application December 30, 1955
Serial No. 556,452

14 Claims. (Cl. 252—33.6)

This invention pertains to high temperature grease compositions having improved resistance to oxidation and resistance to emulsification in water.

The high temperature grease compositions of this invention are more resistant to oxidation and have greater resistance to emulsification in water than those thickened with metal soaps of fatty acids. Although some degree of satisfaction has been obtained from grease compositions thickened with lithium soaps of fatty acids, such lithium soap greases are expensive for many of the uses, and, also, they are less resistant to oxidation than greases prepared from the grease-thickening agents for this invention.

The selection of a grease for a particular job involves more than a selection of a grease because of its general appearance and consistency at room temperature, its extreme pressure characteristics, its melting point, etc. The selection of a grease must be accompanied by the assurance that the grease will maintain its grease characteristics and perform its duties for long periods of time over wide ranges of temperatures and wide variations in pressures at the surfaces being lubricated.

A detrimental result of the oxidation of grease compositions during the period of lubrication is the loss in thickening power of the grease-thickening agent. For example, a grease thickened with a soap of a fatty acid will lose its grease characteristics if the grease-thickening power of the soap is destroyed due to oxidation. When hot greases become oxidized, they lose their grease structure in the form of a melt. This melt then flows away from the surfaces being lubricated, thereby producing lubrication failure. In some greases, the melt, upon continued oxidation, becomes hard and brittle, thereby affording no lubrication of the surfaces. In some instances, the melt becomes oxidized to the degree where acids are performed, which acids are corrosive to the surfaces to be lubricated.

Numerous grease-thickening agents may improve one property of a grease at the expense of other desirable properties; they may be so ineffective as to be commercially unsatisfactory, or they are too expensive. For example, certain greases suffer from hardening on aging and/or deteriorate in the presence of water. Still others become gelatinous in bearing tests. The grease compositions described herein have low age-hardening rates, and high resistance to emulsification in water.

The grease compositions of the present invention have the combined characteristics of high temperature stability, high water resistance, and oxidation resistance. Thus, they have a wide variety of applications, particularly where both water and high temperatures are encountered, such as in sealed bearings of electric motors, sealed bearings of compressors, rocker arms of airplane motors, numerous pieces of high-speed equipment, such as high-speed motors, steel mill rollers and transfer table bearings, paper mill roller bearings, automotive wheel bearings under winter and flood conditions, including use in amphibious military vehicles, high temperature cannery equipment, exposed control surface bearings for aircraft, etc.

The term "high melting point" as used herein means melting points from 300° F. and 400° F., and even as high as 500° F. or higher. Numerous military and industrial grease specifications describe greases having minimum dropping points of 400° F., while at the same time being highly resistant to emulsification in water and resistant to oxidation.

According to the present invention, it has been discovered that high-temperature, water-resistant and oxidation-resistant grease compositions are prepared by the use as thickening agents of the alkali metal salts of copolymers of acrylic acid esters and alpha-substituted acrylamides. Thus, the grease-thickening agents of this invention are alkali metal salts of copolymers of (1) esters of acrylic acid, and (2) alpha-substituted acrylamides.

The terms "esters of acrylic acid" and "acrylic acid esters" mean compounds characterized by the following formula:

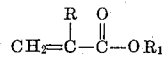

wherein R represents hydrogen and aliphatic radicals containing from 1 to 2 carbon atoms, and $R_1$ represents aliphatic radicals containing from 10 to 22 carbon atoms.

When R is not hydrogen, R is an aliphatic radical containing from 1 to 2 carbon atoms (e. g., the methyl and ethyl radicals); that is, alpha-substituted acrylic acid esters.

Examples of $R_1$ radicals include the radicals derived from decyl alcohol, dodecyl alcohol, tetradecyl alcohol, hexadecyl alcohol, etc.

Examples of "esters of acrylic acid" include decyl acrylate, dodecyl acrylate, tetradecyl acrylate, hexadecyl acrylate, octadecyl acrylate, decyl methacrylate, dodecyl methacrylate, tetradecyl methacrylate, hexadecyl methacrylate, octadecyl methacrylate, decyl ethacrylate, dodecyl ethacrylate, tetradecyl ethacrylate, hexadecyl ethacrylate, octadecyl ethacrylate, etc.

The alpha substituents of the alpha-substituted acrylamides are aliphatic radicals containing from 1 to 2 carbon atoms. Thus, the alpha-substituted acrylamides include methacrylamide and ethacrylamide.

The metal salts set forth herein as grease thickening agents of this invention are prepared by first reacting an acrylic acid ester with an alpha substituted acrylamide, which copolymer is then reacted with an alkali metal hydroxide to form the corresponding alkali metal salt. For the purposes of this invention, it is preferred that the mole ratios of the acrylic acid esters to the alpha-substituted acrylamides are in the range of 3:1 to 6:1.

Lubricating oils which are suitable base oils for the compositions of this invention include a wide variety of lubricating oils such as naphthenic base, paraffin base, and mixed base; other hydrocarbon lubricants, e. g., lubricating oils derived from coal products; and synthetic oils, e. g., alkylene polymers (such as polymers of propylene, butylene, etc., and mixtures thereof), alkylene oxide type polymers, dicarboxylic acid esters, liquid esters of acids of phosphorus, alkylbenzene polymers, polymers of silicon, etc. Synthetic oils of the alkylene oxide type polymers which may be used to include those exemplified by the alkylene oxide polymers (e. g., propylene oxide polymers) and derivatives thereof, including alkylene oxide polymers prepared by polymerizing the alkylene oxides, e. g., propylene oxide, in the presence of water or alcohols, e. g., ethyl alcohol; esters of ethylene oxide type polymers, e. g., acetylated propylene oxide polymers prepared by acetylating propylene oxide polymers containing hydroxyl groups; polyethers prepared from the alkylene glycols, e. g., ethylene glycol, etc.

The polymeric products prepared from the various alkylene oxides and alkylene glycols may be polyoxyalkylene or polyalkylene-glycol derivatives; that is, the terminal hydroxy group can remain as such, or one or both of the terminal hydroxyl groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, valeric acid, etc., with alcohols such as butyl alcohol, hexyl alcohol, 2-ethylhexyl alcohol, dodecyl alcohol, etc. Examples of dicarboxylic acid ester synthetic oils include dibutyl adipate, dihexyl adipate, and di-2-ethylhexyl sebacate, etc.

Synthetic oils of the alkylbenzene type include those which are prepared by alkylating benzene (e. g., dodecyl benzene, tetradecyl benzene, etc.).

Synthetic oils of the type of polymers of silicon include the liquid esters of silicic acid and the polysiloxanes. The liquid esters of silicic acid and the polysiloxanes include those exemplified by tetraethyl silicate, tetraisopropyl silicate, tetra(methyl-2-butyl) silicate, tetra(4-methyl-2-penta) silicate, tetra(1-methoxy-2-propyl) silicate, hexyl(4-methyl-2-pentoxy) disiloxane, poly(methylsiloxane), poly(methylphenyl siloxane), etc. The above base oils may be used individually as such, or in various combinations, wherever miscible or wherever made so by the use of mutual solvents.

The grease thickening agents of this invention are used in an amount sufficient to thicken an oil of lubricating viscosity to the consistency of a grease. In particular, the agents of this invention are used in amounts from about 10% to about 30% by weight of the finished grease composition.

The thickening agents of this invention are prepared by reacting acrylic acid esters with alpha-substituted acrylamides in the presence of a polymerizing catalyst, and the resulting copolymer is further reacted with an alkali metal hydroxide to form the corresponding alkali metal salts.

More particularly, the thickening agents of this invention are prepared by reacting acrylic acid esters with alpha-substituted acrylamides in such relative proportions that the mol ratios of the acrylic acid esters to the alpha-substituted acrylamides are from 3:1 to 6:1; that is, the mol ratios have values ranging from 3 to 6.

The following examples illustrate the preparation of the thickening agents of this invention and the grease compositions from these thickening agents.

*Example 1.—Copolymer of lauryl methacrylate and methacrylamide (6/1 ratio)*

A mixture of 152.4 grams (0.6 mole) lauryl methacrylate, 8.5 grams (0.1 mole) methacrylamide, 0.25 gram benzoyl peroxide, and 75 ml. of benzene was charged to a 2-liter reaction vessel. This mixture was heated, with stirring, at 170° F. to 180° F. for 2.5 hours. Nitrogen was used to blanket the reaction mixture. The resulting copolymer, which was recovered by first dissolving in 300 cc. benzene, then precipitated from solution by the addition of 1 liter of acetone, contained 0.87% nitrogen (theory=0.87%).

*Example 2.—Copolymer of lauryl methacrylate and methacrylamide (3/1 ratio)*

A mixture of 76 grams (0.3 mole) lauryl methacrylate, 8.5 grams (0.1 mole) methacrylamide, 0.25 gram benzoyl peroxide, and 75 ml. of benzene was charged to a 2-liter reaction vessel. This mixture was heated, with stirring, at 170° F. to 180° F. for 2.5 hours. Nitrogen was used to blanket the reaction mixture. The resulting copolymer, which was recovered by first dissolving in 300 cc. benzene, then precipitated from solution by the addition of 1 liter of acetone, contained 1.65% nitrogen (theory=1.65%).

*Example 3.—Preparation of grease thickened with sodium salt of copolymer of lauryl methacrylate and methacrylamide*

A mixture of 5 grams of the copolymer of Example 1 hereinabove, 0.25 gram sodium hydroxide in 10 ml. of 95% ethanol, and 250 ml. benzene was heated under reflux temperature for a period of 2 hours, after which the benzene-alcohol solvents were removed by distillation. The resulting sodium salt was added to 21.5 grams of a California solvent refined paraffin base oil having a viscosity of 480 SSU at 100° F. The resulting mixture was heated with stirring to a temperature of 450° F., after which the composition was milled through a 3-roll mill four times and reheated to a temperature of 500° F. The resulting grease had an ASTM penetration of 315 at 70° F. (unworked), and an ASTM dropping point of 505° F.

*Example 4.—Preparation of grease thickened with sodium salt of copolymer of lauryl methacrylate and methacrylamide*

A mixture of 5 grams of the copolymer of Example 2 hereinabove, 0.15 gram of sodium hydroxide, and 20 grams of a California solvent-refined paraffin base oil having a viscosity of 480 SSU at 100° F. was heated with violent agitation at 500° F. until the pH of the mixture had a value of 7.5. Upon cooling the mixture, a smooth gelatinous grease was obtained.

As stated hereinabove, the grease compositions of this invention are highly resistant to emulsification in water. Samples of the greases hereinabove do not emulsify when placed in boiling water.

In addition to the components noted hereinabove, the grease compositions may include such other additives useful as corrosion inhibitors, extreme pressure agents, antiwear agents, stabilizers, V. I. improvers, and the like.

We claim:

1. A grease composition comprising a major proportion of an oil of lubricating viscosity and, in an amount sufficient to thicken said oil to the consistency of a grease, an alkali metal salt of a copolymer of (1) an ester of acrylic acid, and (2) an alpha-substituted acrylamide, wherein the mole ratio of (1) to (2) is from 3:1 to 6:1, wherein said alpha substituent is an aliphatic radical having from 1 to 2 carbon atoms, and said ester of acrylic acid is characterized by the formula:

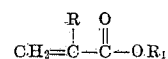

wherein R represents hydrogen and aliphatic radicals containing from 1 to 2 carbon atoms, and $R_1$ represents an aliphatic radical containing from 10 to 22 carbon atoms.

2. A grease composition comprising a major proportion of an oil of lubricating viscosity and, in an amount sufficient to thicken said oil to the consistency of a grease, an alkali metal salt of a copolymer of (1) an alpha-substituted ester of acrylic acid, and (2) an alpha-substituted acrylamide, wherein the mole ratio of (1) to (2) is from 3:1 to 6:1, wherein said alpha substituent is an aliphatic radical having from 1 to 2 carbon atoms, and said ester of acrylic acid is characterized by the formula:

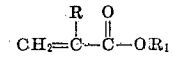

wherein R represents hydrogen and aliphatic radicals containing from 1 to 2 carbon atoms, and $R_1$ represents an aliphatic radical containing from 10 to 22 carbon atoms.

3. A grease composition comprising a major proportion of an oil of lubricating viscosity and, in an amount sufficient to thicken said oil to the consistency of a grease, a sodium salt of a copolymer of (1) an alpha-substituted ester of acrylic acid, and (2) an alpha-substituted acrylamide, wherein the mole ratio of (1) to (2) is from 3:1 to 6:1, wherein said alpha substituent is an aliphatic radical having from 1 to 2 carbon atoms, and said ester of acrylic acid is characterized by the formula:

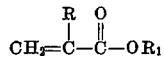

wherein R represents hydrogen and aliphatic radicals containing from 1 to 2 carbon atoms, and $R_1$ represents an aliphatic radical containing from 10 to 22 carbon atoms.

4. A grease composition comprising a major proportion of an oil of lubricating viscosity and, in an amount sufficient to thicken said oil to the consistency of a grease, an alkali metal salt of a copolymer of (1) an ester of acrylic acid, and (2) an alpha-substituted acrylamide, wherein the mole ratio of (1) to (2) is 3:1, wherein said alpha substituent is an aliphatic radical having from 1 to 2 carbon atoms, and said ester of acrylic acid is characterized by the formula:

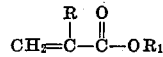

wherein R represents hydrogen and aliphatic radicals containing from 1 to 2 carbon atoms, and $R_1$ represents an aliphatic radical containing from 10 to 22 carbon atoms.

5. A grease composition comprising a major proportion of an oil of lubricating viscosity and, in an amount sufficient to thicken said oil to the consistency of a grease, an alkali metal salt of a copolymer of (1) an ester of acrylic acid, and (2) an alpha-substituted acrylamide, wherein the mole ratio of (1) to (2) is 6:1, wherein said alpha substituent is an aliphatic radical having from 1 to 2 carbon atoms, and said ester of acrylic acid is characterized by the formula:

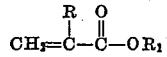

wherein R represents hydrogen and aliphatic radicals containing from 1 to 2 carbon atoms, and $R_1$ represents an aliphatic radical containing from 10 to 22 carbon atoms.

6. A grease composition comprising a major proportion of an oil of lubricating viscosity and, in an amount sufficient to thicken said oil to the consistency of a grease, an alkali metal salt of a copolymer of (1) a methacrylic acid ester, and (2) methacrylamide, wherein the mole ratio of (1) to (2) is from 3:1 to 6:1, wherein the ester radical of said methacrylic acid ester is an aliphatic radical containing from 10 to 22 carbon atoms.

7. A grease composition comprising a major proportion of an oil of lubricating viscosity and, in an amount sufficient to thicken said oil to the consistency of a grease, a sodium salt of a copolymer of (1) a methacrylic acid ester, and (2) methacrylamide, wherein the mole ratio of (1) to (2) is from 3:1 to 6:1, wherein the ester radical of said methacrylic acid ester is an aliphatic radical containing from 10 to 22 carbon atoms.

8. A grease composition comprising a major proportion of a petroleum oil and, in an amount sufficient to thicken said petroleum oil to the consistency of a grease, an alkali metal salt of a copolymer of (1) a methacrylic acid ester, and (2) methacrylamide, wherein the mole ratio of (1) to (2) is from 3:1 to 6:1, wherein the ester radical of said methacrylic acid ester is an aliphatic radical containing from 10 to 22 carbon atoms.

9. A grease composition comprising a major proportion of an oil of lubricating viscosity and from 10% to 30%, by weight, of an alkali metal salt of a copolymer of (1) lauryl methacrylate, and (2) an alpha-substituted acrylamide, wherein the mole ratio of (1) to (2) is from 3:1 to 6:1, wherein said alpha substituent is an aliphatic radical having from 1 to 2 carbon atoms.

10. A grease composition comprising a major proportion of an oil of lubricating viscosity and from 10% to 30%, by weight, of an alkali metal salt of a copolymer of (1) lauryl methacrylate, and (2) methacrylamide, wherein the mole ratio of (1) to (2) is from 3:1 to 6:1.

11. A grease composition comprising a major proportion of an oil of lubricating viscosity and from 10% to 30%, by weight, of a sodium salt of a copolymer of (1) lauryl methacrylate, and (2) methacrylamide, wherein the mole ratio of (1) to (2) is from 3:1 to 6:1.

12. A grease composition comprising a major proportion of a petroleum oil of lubricating viscosity and, in an amount sufficient to thicken said petroleum oil to the consistency of a grease, an alkali metal salt of a copolymer of (1) lauryl methacrylate, and (2) methacrylamide, wherein the mole ratio of (1) to (2) is from 3:1 to 6:1.

13. A grease composition comprising a major proportion of a petroleum oil and from 10% to 30%, by weight, of an alkali metal salt of a copolymer of (1) lauryl methacrylate, and (2) methacrylamide, wherein the mole ratio of (1) to (2) is from 3:1 to 6:1.

14. A grease composition comprising a major proportion of a petroleum oil and from 10% to 30%, by weight, of a sodium salt of a copolymer of (1) lauryl methacrylate, and (2) methacrylamide, wherein the mole ratio of (1) to (2) is from 3:1 to 6:1.

References Cited in the file of this patent

UNITED STATES PATENTS

| | | |
|---|---|---|
| 2,443,378 | Dittmar et al. | June 15, 1948 |
| 2,491,028 | Beerbower et al. | Dec. 13, 1949 |
| 2,577,706 | Hotten | Dec. 4, 1951 |
| 2,604,453 | Popkin | July 22, 1952 |
| 2,610,114 | Fischer et al. | Sept. 9, 1952 |
| 2,613,184 | Catlin | Oct. 7, 1952 |
| 2,718,497 | Oldham et al. | Sept. 20, 1955 |
| 2,737,496 | Catlin | Mar. 6, 1956 |

FOREIGN PATENTS

| | | |
|---|---|---|
| 492,320 | Great Britain | Sept. 19, 1938 |

UNITED STATES PATENT OFFICE

Certificate of Correction

Patent No. 2,868,728 January 13, 1959

Bruce W. Hotten et al.

It is hereby certified that error appears in the printed specification of the above numbered patent requiring correction and that the said Letters Patent should read as corrected below.

Column 1, line 50, for "performed" read —formed—; column 5, lines 22 to 24, the formula should appear as shown below instead of as in the patent—

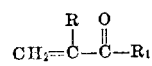

Signed and sealed this 16th day of June 1959.

[SEAL]

Attest:
KARL H. AXLINE,
*Attesting Officer.*

ROBERT C. WATSON,
*Commissioner of Patents.*